Patented May 27, 1941

2,243,331

UNITED STATES PATENT OFFICE 2,243,331

SULPHONATE

Martin de Simo, Piedmont, and John J. O'Connor, Oakland, Calif., assignors to Shell Development Company, San Francisco, Calif., a corporation of Delaware No Drawing. Application August 29, 1939,
Serial No. 292,444

10 Claims. (Cl. 260—513)

This invention relates to new chemical compounds and methods for their production as well as the application of these compounds to many technically important uses. More particularly the invention relates to unsaturated sulphonates and deals with a novel class of such compounds having a sulphonated saturated carbon atom directly attached to an olefinic carbon atom, particularly allyl type sulphonic acids having five or more carbon atoms per molecule and salts, esters and other derivatives of such acids.

An important object of the invention is the preparation of a new type of capillary active compounds having improved properties. A further object is the provision of methods for manufacturing the new compounds of the invention by novel and easily conducted processes which give products of high quality. Still another object is to apply these new compounds in a wide variety of uses where their desirable properties offer particular advantages.

In spite of the superior stability of sulphonic acids and their salts, compounds of this type have had only very restricted technical application compared with the less stable carboxylic acid and sulphuric acid ester salts because of the low solubility of the previously available sulphonates. It has now been found that sulphonates having a sulphonate group and a double bond in allylic relation to each other are not only surface active but also are much more soluble in water and many other solvents and are superior for many applications such, for example, as wetting agents and detergents, to the corresponding saturated sulphonates. The allyl type sulphonates are useful frothing agents particularly adapted for use as interface modifying agents under conditions of acidity or alkalinity at which soaps are less suitable. Those of five to ten or more carbon atoms are excellent froth flotation agents and may be used in the presence of either acid or alkali. The new allyl type sulphonates having eight to twenty carbon atoms per molecule are desirable wetting agents, particularly useful in the cleaning and processing of textiles. They are especially advantageous in acid baths for the fulling of wool, in acid dyeing and in acid carbonizing media as well as in mercerizing liquors of high alkalinity.

The improved products of this invention may be prepared by a number of different methods. For example, suitable allyl type mercaptans and disulphides, may be oxidized. Allyl type mercaptans which may be used include, for example 1-methyl-2-pentenethiol

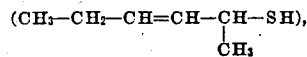

1-ethyl-2-butenethiol, 3-methyl-2-pentenethiol, 1-ethyl-3-methyl-2-butenethiol, 3-methyl-2-ethyl-2-pentenethiol, 1,3-dimethyl-1-ethyl-2-pentenethiol, 1-methyl-1-propyl-2-hexenethiol, 1,2,3-trimethyl-1-ethyl-2-pentenethiol, 1,2-dimethyl-1-hexyl-2-propenethiol, 1-methyl-1-octyl-2-propenethiol, 2,3-dimethyl-1-pentyl-2-pentenethiol, 3-methyl-1-(3-ethyl) heptyl-2-butenethiol, 1-dodecyl-2-propenethiol, 2-methyl-1-pentyl-2-undecenethiol, 1-octyl-1-nonenethiol, 2-methyl-1-(5,5-dimethyl) dodecyl-2-propenethiol, 1-heptyl-2-dodecenethiol, etc. The oxidation may be carried out using individual allyl type mercaptans or mixtures thereof with or without compounds which may be inert or which may undergo oxidation or other reaction without interfering with the oxidation of the allyl type mercaptan or mercaptans to the desired allyl type sulphonic acid. The oxidation may advantageously be affected with nitric acid, hydrogen peroxide, potassium permanganate and the like. Instead of oxidizing the allyl type mercaptans, the corresponding mercaptides, such for example, as the lead mercaptides and the like, may be oxidized to directly obtain salts of the allyl type sulphonic acids.

Alternatively reaction of allyl type halides with alkali metal, alkaline earth, heavy metal, ammonium and like, preferably water-soluble, sulphites may be used for the preparation of the novel allyl type sulphonates of the invention. The resonant position of the double bond and the reactive group may lead to rearrangement in this type of reaction. There may also be some hydroxy-sulphonate formation as a result of addition of bisulphite to the double bond but this is not detrimental in most cases. The availability of inexpensive starting materials makes this an attractive method of producing allyl type sulphonates. The highest yields have been obtained with allyl type halides having the halogen in a primary position, or which undergo rearrangement to such primary allyl type halides under the reaction conditions, but sulphonates have been successfully produced also by reaction of secondary allyl type halides which are not capable of allylic rearrangement to primary halides, with sodium sulphite. The allyl type secondary halides of five to about ten carbon atoms per molecule give higher yields in most cases than the corresponding higher molecular halides. For the preparation of the new allyl type sulphonates of the invention by the reaction of alkali metal or like sulphites, the preferred allyl type halides are those of the type of, for example, 1-chloropentene-2, 1-chlorohexene-2, 1-chloro-2-butyl-propene-2, 1-chloroctene-2, 1-chlor-2-ethyl-hexene-2, 1-chloro-7-methyl-octene-2, 1-chloro-2,7-dimethyl-octene-2, 1-chloro-2-octyl-propene-2, 1-chloro-8-ethyl-decene-2, 1-chloro-2-undecyl-propene-2, 1-chloro-2-methyl-tetradecene-2 and homologues thereof. Other allyl type halides which may be used include 3-chloro-2-methyl-pentene-1, 4-chloro-hexene-2, 3-chloro-3-methyl-pentene-1, 3-chloro-hexene-1, 3-chloro-2-methyl-hexene-1, 3-chloro-2,3-dimethyl-pentene-1, 3-chloro-octene-1, 3-chloro-decene-1, 1-chloro-2,3-dimethyl-dodecene-2, 1-chloro-3,9-diethyl-undecene-2 and the like. Instead of the individual allyl type halides, mixtures may be used which may contain other halides and/or other compounds which may be inert under the reaction conditions or may undergo change without inhibiting the desired sulphonate formation. Thus new mixed chlorides produced, for example, by high temperature chlorination of olefine containing hydrocarbon in accordance with U. S. Patents 2,077,382 and 2,130,084, may advantageously be used as starting material. Pyrolysis of dihalides formed by addition of halogen to olefines of six or more carbon atoms having the double bond preferably not more than once removed from the end of the chain provides another suitable source of allyl type halides for use in the process of the invention, which can be advantageously used with such starting material to separate vinyl type halides from the allyl type halides since the former are substantially unreactive under the preferred conditions for reacting allyl type halides of six or more carbon atoms with sodium sulphite and the like. The process is preferably carried out using an excess of sulphite and a temperature of the order of 100° to about 200° C. It may be applied to the purification of allyl type halides containing an organic halide having a halogen atom further removed from the double bond.

Other methods of preparing the new allyl type sulphonates include dehydration of suitable hydroxy sulphonates, such for example, as those having a hydroxyl group attached to a carbon atom once removed from the sulphonated carbon atom and the like, dehydrohalogenation of halogenated sulphonates which form allyl type sulphonates on splitting out of halogen acid, oxidation of allyl type sulphinic acids, thiosulphuric acid esters and the like. Such methods are economically less attractive at present because of the higher cost of starting materials as compared with the preferred methods using halides, sulphuric esters or mercaptans.

The allyl type sulphonates of six or more carbon atoms per molecule of the invention may be used in the form of the free sulphonic acids or as salts of any basic reacting substance which provides a cation to replace the hydrogen atom of the sulphonic acid group or as esters of the allyl type sulphonates or other suitable derivatives. The ammonium, alkali metal, alkaline earth metal and amine salts, including alkylolamine salts, for example, are useful where the allyl type sulphonates are to be used as wetting agents, detergents, frothing and emulsification agents and the like. The copper, mercury and lead salts have valuable insecticidal and fungicidal uses. Esters, such as ethyl esters of straight-chain primary allyl type sulphonates of 18 to 24 carbon atoms, for example, may be used as components of dielectric liquids, being suitably prepared by reaction of the allyl type chlorsulphonic acid with the alcoholate corresponding to the alcohol of the desired ester.

The new compounds may be applied in the form of solutions in water, alcohol, acetone or other suitable solvents or as pastes or suspensions or emulsions whether aqueous or not or as anhydrous materials. The allyl type sulphonates of the invention may be used in a pure form such, for example, as the product of crystallization from alcohol or other suitable solvents, or in admixture with other materials. Thus the crude products obtained in manufacture and containing inorganic salts and/or organic compounds which may or may not be sulphonates or the like may be advantageously used for many purposes without purification. Where it is desirable, however, the allyl type sulphonates may be purified by extraction, for example, taking advantage of the greater water solubility of these new compounds as compared with the corresponding saturated and hydroxy sulphonates and the like. The pure sodium salts, for example, crystallize as fine plates. They are soaplike and form clear, non-viscous solutions which give a copious, persistent foam on agitation. Such solutions have a higher tolerance for calcium salts than solutions of the corresponding saturated sulphonates. The aqueous solutions take up large amounts of ether, benzene and similar water immiscible liquids to form clear solutions and by addition of further amounts of such liquids or of water, form emulsions.

The following examples illustrates the preparation of typical aliphatic allyl type sulphonates of our invention.

Example I

In a chromium-lined autoclave, 0.271 mols of 3-chloroctene-1, 0.385 mols of sodium sulphite and 500 grams of water were heated with good agitation for 2½ hours at 120° C. to 130° C. The total conversion of chloride was 89%. The aqueous reaction product was evaporated to dryness and the residue extracted with ethyl alcohol. The sulphonated product was crystallized from the ethyl alcohol solution as white crystals of the following composition:

|  | C | H | S | Na | O (by diff.) | Bromine number gms. Br₂ per 100 gms. |
|---|---|---|---|---|---|---|
| Found_____percent__ | 43.6 | 7.1 | 15.8 | 9.1 | 24.4 | 62.0 |
| Calculated for $C_8H_{15}SO_3Na$__ | 44.82 | 7.06 | 14.97 | 10.73 | 22.41 | 74.6 |

The yield of sulphonate was 61% of which 83.2% was allyl type sulphonate as indicated by Bromine number and 16.8% was hydroxysulphonate.

Example II

In the same apparatus, 0.200 mols of 3-chlor-pentodecene-1, 0.236 mols of sodium sulphite and 340 grams of water were heated with agitation for three hours at 175° C. The reaction product was recovered and purified as in Example I, a conversion of 89.6% being obtained. Analysis showed that 67.3% of the product was allyl type unsaturated sulphonate and 32.7% was hydroxysulphonate.

Example III 4-chlorohexene-2 and 4-chloroctene-2 were separately reacted with an aqueous solution of 15 mol % excess of sodium sulphite in a Carius tube in a steel jacket arranged for shaking. After two hours at 125° to 130° C. it was found that conversions of 99.0% and 89.3% respectively, had been obtained. After separation of hydrolysis products and unreacted chloride the allyl type sodium sulphonates produced could be readily recovered from their aqueous solution as in Example I.

Example IV

By the same method as used in Example III 3-chlorohexene-1 and 1-chloropentene-2 were reacted, the conditions and results being as follows:

|  | Temp. | Time | Reacted | Sulphonate yield (based on chloride reacted) |
|---|---|---|---|---|
|  | °C. | Hours | Per cent | Per cent |
| 3-chlorohexene-1 | 130 | 2.25 | 88.0 | 68.2 |
| 1-chloropentene-2 | 130 | 1.25 | 91.4 | 79.2 |

Altho the allyl type sulphonates described as specific examples are straight-chain compounds of five to fifteen carbon atoms per molecule, it is to be understood that the invention should not be so limited. Other allyl type sulphonates which may be prepared by the previously described methods, include, for example, branched-chain aliphatic sulphonates, such as 7-methyl-2-octene sulphonic acid, 2-methyl-2-hexenesulphonic acid, 1-methyl-1-butyl-2-butenesulphonic acid,

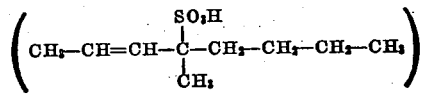

1,3,5-trimethyl-1-propyl-2-hexenesulphonic acid and the like, cyclic sulphonates such as

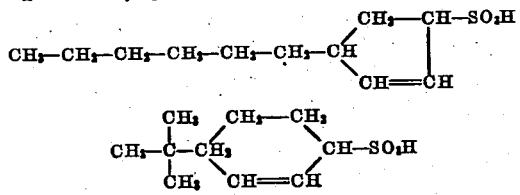

and the like and suitable homologues, analogues and substitution products of such allyl type sulphonic acids. It is preferred, however, in preparing the new compounds of the invention not to employ methods which involve the production of compounds containing other polar groups attached to the sulphonated carbon atom and preferred products are those containing no other hydrophile group than the sulphonate group. The presence of chlorine atoms, phenyl groups and the like may be advantageous for certain purposes.

We claim as our invention:

1. A sodium salt of a primary aliphatic monosulphonic acid containing less than 20 carbon atoms per molecule in which at least ten carbon atoms are in a straight chain having the sulphur atom of the sulphonate group directly attached to a saturated carbon atom which is joined directly to an olefinic carbon atom.

2. An alkali metal salt of an aliphatic monosulphonic acid containing at least six and not more than twenty carbon atoms per molecule having the sulphur atom of the sulphonate group directly attached to a saturated carbon atom which is joined directly to an olefinic carbon atom.

3. A salt of a monosulphonic acid containing at least six carbon atoms in an aliphatic chain having the sulphur atom of the sulphonate group directly attached to a saturated carbon atom which is joined directly to an olefinic carbon atom.

4. A nitrogen base salt of a monosulphonic acid containing at least six carbon atoms in an aliphatic group having the sulphur atom of the sulphonate group directly attached to a saturated carbon atom which is joined directly to an olefinic carbon atom.

5. An ester of a monosulphonic acid containing at least six carbon atoms in an aliphatic chain having the sulphur atom of the sulphonate group directly attached to a saturated carbon atom which is joined directly to an olefinic carbon atom.

6. A monosulphonated hydrocarbon containing at least six carbon atoms per molecule having a sulphonated methylene carbon atom directly attached to an olefinic carbon atom.

7. A monosulphonated hydrocarbon containing at least five carbon atoms per molecule having the sulphonate group directly attached to a saturated carbon atom which is joined directly to an olefinic carbon atom.

8. A process for producing an allyl type sulphonate containing at least five carbon atoms per molecule which comprises oxidizing a mercaptan having at least five carbon atoms per molecule and a thiol group attached to a saturated tertiary carbon atom which is joined directly to an olefinic carbon atom under conditions at which oxidation of the thiol group to a sulphonic acid group takes place without substantial rupture of the mercaptan.

9. A process for producing an allyl type sulphonate containing at least five carbon atoms per molecule which comprises oxidizing a mercaptan having at least five carbon atoms per molecule and a thiol group attached to a saturated secondary carbon atom which is joined directly to an olefinic carbon atom under conditions at which oxidation of the thiol group to a sulphonic acid group takes place without substantial rupture of the mercaptan.

10. A process for producing an allyl type sulphonate containing at least five carbon atoms per molecule which comprises oxidizing a mercaptan having at least five carbon atoms per molecule and a thiol group attached to a saturated carbon atom which is joined directly to an olefinic carbon atom under conditions at which oxidation of the thiol group to a sulphonic acid group takes place without substantial rupture of the mercaptan.

MARTIN DE SIMO.
JOHN J. O'CONNOR.